United States Patent [19]

Kline

[11] Patent Number: 5,379,936

[45] Date of Patent: Jan. 10, 1995

[54] FLOW CONTROL VALVE ASSEMBLY

[75] Inventor: Kevin B. Kline, Indianapolis, Ind.

[73] Assignee: Lawler Manufacturing Co., Inc., Indianapolis, Ind.

[21] Appl. No.: 154,965

[22] Filed: Nov. 19, 1993

[51] Int. Cl.⁶ .............................................. G05D 23/13
[52] U.S. Cl. .............................. 236/12.2; 137/625.35; 236/DIG. 2
[58] Field of Search ......................... 236/DIG. 2, 12.2; 137/625.35, 625.39, 625.4

[56] References Cited

U.S. PATENT DOCUMENTS

| | | | |
|---|---|---|---|
| 289,954 | 12/1883 | Badger | 137/625.35 |
| 3,925,283 | 12/1975 | Delpla | 236/12.2 |
| 4,475,684 | 10/1984 | Garlick et al. | 236/DIG. 2 |
| 5,011,074 | 4/1991 | Kline | 236/DIG. 2 |

*Primary Examiner*—William E. Tapoical
*Attorney, Agent, or Firm*—Woodard, Emhardt, Naughton, Moriarty & McNett

[57] ABSTRACT

A fluid condition controlled mixing valve assembly includes a valve body having a warm fluid inlet, a relatively chilled fluid inlet, a fluid mixing chamber, and a fluid outlet in communication with the mixing chamber. A thermally responsive control member, or thermostat, is disposed within the mixing chamber. A cylindrical liner is situated within the valve body with openings for chilled fluid flow and warm fluid flow. Concentrically located piston and valve disc are connected through an actuator to the thermostat so that the piston and disc move according to the thermostat response to the fluid temperature in the mixing chamber. The piston controls flow through the fluid openings. The liner and the shuttle define primary and secondary passageways. Fluid flows through the primary passageway when the flow control member is in a normal operating condition, i.e., with substantial fluid flow through both inlets. If flow through one of the inlets ceases, the shuttle moves to a failure condition, in which substantially all flow from the inlets is directed through a secondary passageway. This provides a fluid of a desired condition when there is substantial flow through both inlets and a fluid of a less desirable but acceptable condition when substantial flow through one of the inlets ceases.

20 Claims, 4 Drawing Sheets

FLOW CONTROL VALVE ASSEMBLY

BACKGROUND OF THE INVENTION

The present invention concerns fluid condition controlled mixing valves. In particular, the invention concerns a mixing valve responsive to varying fluid conditions, such as temperature, to maintain a desired stable fluid condition. The invention also concerns a bypass mechanism which provides a constant flow of fluid when the desired condition cannot be achieved.

Thermally controlled or thermostatic mixing valves are well known. Many such fluid mixing valves include a single control knob that can be rotated to vary the temperature of the output fluid between off, cold and hot positions. The valve member is controlled by a thermally responsive control member, or a thermostat, to maintain the fluid temperature according to the setting of the control knob. Thermally operated mixing valves are frequently used to control the temperature water through a shower fitting. Other applications include an emergency eye-wash fountain in which tepid water is providing for washing the eyes of a victim of some contamination. In both cases, it is important the mixing valve properly operate to maintain the pre-set temperature of the flow of liquid from the valve. In many cases, the mixing valve maintains the temperature of the output liquid to within plus or minus 2° F. of the preset temperature.

In an application of mixing valves in which the output fluid is in contact with the user, it is critical that some form of emergency shut-off be provided in the event of a failure of at least the cold fluid source. In the absence of such an emergency mechanism, the user may be scalded by the hot water flowing exclusively through the valve in the absence of cold mixing water, during the lag before the thermostat functions to shut the valve off. In other applications, such as the eye-wash application, it is also important that the mixing valve has some means for maintaining some flow of liquid through the valve in the event of a failure of the valve or thermal control member. In the eye-wash application, it is imperative that at least some cold water is maintained, otherwise the victim may suffer serious injury for failure to wash the eyes completely. U.S. Pat. No. 5,011,074 to the present inventor teaches a thermostatic mixing valve with a thermostatic failure compensation means. In the event of a failure of the thermostat, the invention operates to prevent hot flow into the mixing chamber.

In other applications of mixing valves, such as in combination with carbonated beverage dispensers, it is desirable to provide a fluid with a desired temperature. Fluid from a chiller is mixed with room-temperature (warm) fluid to achieve a desired temperature. This temperature controlled fluid is fed to a carbonator such as may be found in a commercial soda machine or carbonated beverage dispenser.

However, if the chiller is not properly maintained, the chiller or the lines from the chiller may become clogged with ice. When this occurs, a prior art thermostatic mixing valve would operate to shut down the output of fluid because the thermostat, sensing only warm fluid would try to feed more cold and less warm fluid. A prior art mixing valve would regulate the relative flow volume of a warm fluid versus the flow volume of a relatively chilled into the mixing chamber fluid in order to maintain a constant temperature of the output fluid. If the flow of the chilled fluid ceased, the temperature in the mixing chamber would therefore increase and the thermostat and the mixing valve would react to restrict or stop the input of the warm fluid. This would lead to substantial decrease in or complete cessation of fluid output, which is unacceptable in commercial applications, such as fast food restaurants. The present invention provides a thermostatic mixing valve with a bypass mechanism that ensures a room temperature product fluid in the absence of chilled fluid. The valve, in essence, frustrates the normal function of a thermostatic valve when a flow of fluid ceases.

SUMMARY OF THE INVENTION

A flow control mixing valve assembly is provided with a condition responsive actuator to maintain a desired fluid condition by governing the relative amounts of incoming fluids into a mixing chamber. The assembly is also provided with a bypass mechanism to allow outflow of a fluid with a less desirable but acceptable condition when substantial flow of one of the incoming fluids ceases. The flow control mixing valve assembly is useful for several fluid conditions, such as temperature, pH or concentration.

In particular, the assembly may mix a warm incoming fluid with a chilled incoming fluid to achieve a product fluid of a specific temperature. When either the warm or the chilled fluid supply is disrupted, the prior art mixing valve assemblies will fail because the desired temperature cannot be achieved. This valve assembly has a bypass mechanism which allows flow of product fluid of any temperature when the desired temperature cannot be achieved.

In one aspect of the invention, the valve assembly includes a room temperature inlet and a relatively chilled fluid inlet, fed to a mixing chamber provided with a fluid outlet. A thermally responsive control member, such as a bellows thermostat, is disposed within the mixing chamber to control the temperature of the outlet fluid. Flow control means are connected to the thermostat for controlling the flow of warm or chilled fluid from their respective inlets into the mixing chamber. The flow control means includes a reciprocating actuator with a valve disc engaged to the actuator. The flow control means and thermostat normally operate to restrict one fluid inlet when the fluid flow ceases from the other inlet.

For example, when flow from the chilled inlet is disrupted, the temperature in the mixing chamber will rise. The condition responsive actuator acts upon the flow control member to stop flow from the warm fluid inlet while allowing flow from the chilled fluid inlet. Since the flow from the chilled fluid inlet has ceased, all fluid flow into the valve will substantially cease. The flow control member of the present invention then moves to a failure position. The bypass mechanism allows warm fluid to enter the mixing chamber and exit through the outlet. In one embodiment, the bypass mechanism comprises an alternate fluid passageway through the valve to the mixing chamber.

This flow control mixing valve assembly mixes incoming fluids to a achieve a product fluid with a desired condition when there is substantial flow through both inlets. The assembly is provided with a bypass mechanism that ensures a fluid with a less desirable but acceptable condition when substantial flow through one of the inlets ceases.

DESCRIPTION OF THE PREFERRED EMBODIMENT

For the purposes of promoting an understanding of the principals of the invention, reference will now be made to the embodiment illustrated in the drawings and specific language will be used to describe the same. It will nevertheless be understood that no limitation of the scope of the invention is thereby intended, such alterations and further modifications in the illustrated device and such further applications of the principals of the invention as illustrated therein being contemplated as it would normally occur to one skilled in the art to which the invention relates.

Figure 1:
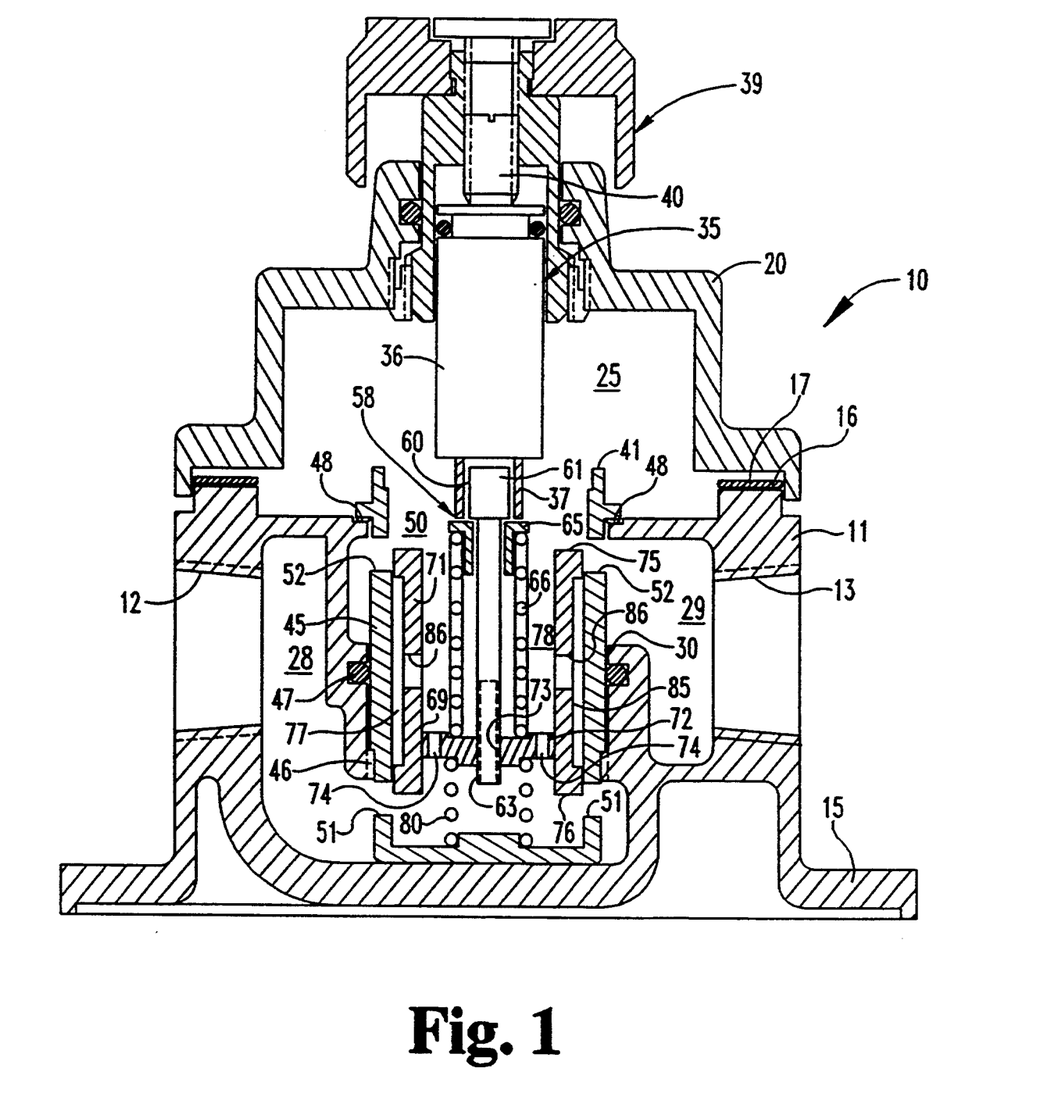
FIG. 1 is a side cross-sectional view of a thermally controlled mixing valve assembly embodying the present invention.

A flow control valve assembly 10 according to a preferred embodiment of the present invention is shown in cross-section in FIG. 1. The flow control mixing valve assembly 10 includes a valve body 11 having a warm fluid inlet 12, a relatively chilled fluid inlet 13, and an outlet (not shown). The valve body 11 includes a mounting flange 15 having a bolt circle which permits mounting. The inlets 12 and 13 and the outlet can be threaded to permit engagement with a pipe or threaded tube.

The valve body 11 includes a mounting face 16 on which is placed a gasket 17 which may be composed of rubber or other suitable sealing material. An upper housing 20 is attached to the valve body. The engagement of the upper housing 20 to the valve body 11 forms a mixing chamber 25 therebetween that communicates with the outlet of the valve body 11. In normal operation, warm and chilled fluids flow through their respective inlets 12 and 13 and are mixed within the mixing chamber 25 to flow through the outlet. In the specific embodiment, the warm fluid is room temperature city tap water and the chilled fluid is city water which has been cooled in a chiller. The outlet is connected to a carbonator which is a component of a carbonated beverage dispenser.

The flow control mixing valve assembly 10 includes a condition responsive actuator 35. In the preferred embodiment, the actuator includes a bellows thermostat 36 which can be of well known construction. For instance, the bellows may be formed of stainless steel, brass or, preferably a phosphor bronze. The bellows is also preferably fluid filled, such as with freon, alcohol, or some other thermally responsive oil. As is well known with bellows-type thermostat, the fluid within the bellows reacts to changes in surrounding temperatures by a change in volume. As the fluid volume changes, the bellows expands or contracts. An actuator sleeve 37 is affixed to the bellows thermostat so that it too extends or retracts in accordance with the thermal response of the bellows thermostat 36.

The actuator 35 includes a control knob assembly 39 having an adjustment pin 40 which contacts the top of the bellows thermostat 36 to move the thermostat axially within the mixing chamber 25. The control knob assembly 39 provides for stepless adjustment of the temperature of the outlet fluid, in a manner that is well-known in the art.

As shown in FIG. 1, the warm fluid inlet 12 includes a channel 28 passing into the valve body 11. Likewise, the chilled fluid inlet 1B includes a chilled fluid channel 29 through the interior of the valve body 11 that is separate from the warm fluid channel 28. The valve body 11 defines a central cavity 30 that is interposed in fluid communication between the warm fluid channel 28 and the chilled fluid channel 29, and that opens into the mixing chamber 25.

The flow control mixing valve assembly 10 includes a flow control member 41 for controlling the relative flow of warm and chilled fluid into the mixing chamber 25. This flow control member 41 comprises a liner 45 disposed within the central cavity 30. The liner 45 is engaged at a threaded portion 46 to the lower end of the central cavity 30. A seal ring 47 and a gasket 48, held in place by an upper flange of the liner 45, seal the liner within the central cavity 30 and prevent leakage between warm and chilled fluid channels 28 and 29. Thus, fluid passing through the central cavity 30 to the mixing chamber 25 must pass through the interior of the liner 45.

Liner 45 is of generally cylindrical construction with an open top and bottom and defines a central chamber 50. In the preferred embodiment, two openings 51 and 52 are cut in the liner to provide communication with the chilled fluid channel 29 and central chamber 50 of the liner. Warm fluid enters the liner through its open bottom.

The flow control mixing valve assembly 10 further comprises an actuator assembly 58. The actuator assembly 58 includes a guide post 60 consisting of a rod having an enlarged cylindrical upper end 61 and a threaded lower end 63. A retainer 65 contacts enlarged end 61 of the guide post 60 and restrains a relief spring 66 which is situated within the actuator assembly 58. The actuator sleeve 37 of the condition responsive actuator 35 contacts the upper surface of the retainer 65 to force the actuator assembly 58 downward as the bellows thermostat 36 expands.

The actuator assembly 58 operates to control the displacement of a cylindrical shuttle 70 which is concentrically disposed within the liner 45. The shuttle 70 includes a piston 71 and a valve disc 72. The shuttle 70 defines a central chamber 78. The piston 71 is generally an open-ended cylinder. A valve disc 72 is circumferentially attached at an attachment point 69 on the lower internal wall of the piston 71. The valve disc 72 includes a threaded opening 73 into which the threaded end 63 of the guidepost 60 is engaged.

The valve disc 72 defines a number of flow openings 74 at the bottom of the shuttle 70 for the passage of warm fluid. In the normal operating condition, warm fluid flows through the warm fluid channel 28 and into the central chamber 78 on its way to be mixed with the chilled fluid in the mixing chamber 25. The relief spring 66 of the actuator system 58 acts against the valve disc 72 of the shuttle 70.

The components of the mixing valve assembly 10 described thus far form a typical thermostatic mixing valve. In normal operation of the valve, the bellows thermostat 36 of the actuator 35 manipulates the shuttle 70 within the liner 45 to vary the amount of warm and chilled water flow into the mixing chamber 25. Thus, in the normal operating range, the shuttle 70 will move between positions in which the shuttle 70 restricts, or partially closes, the chilled fluid opening 52 or the warm fluid opening 51. When the bellows thermostat 36 expands in response to the warmth of the fluid in the mixing chamber 25, the shuttle 70 is pushed to a position where it closes more of the warm fluid opening 51. The upper edge of the shuttle does not significantly impinge or close the opening 52 in the liner 45. Thus, the chilled fluid flows freely into the mixing chamber 25 for discharge through the outlet.

On the other hand, when the temperature of the fluid in the mixing chamber 25 drops, the bellows thermostat 36 contracts and a biasing spring 80 biases the valve disc 72 upward toward the bellows thermostat 36. The biasing spring 80 operates to force the entire actuator assembly 58, shuttle 70, and valve disc 72 upward as the actuator sleeve 37 of the bellows thermostat 36 retracts. As the thermostat 36 contracts, the shuttle 70 moves to permit more flow of warm fluid into the mixing chamber 25. In this orientation, the bellows thermostat 36 has retracted along with the actuator sleeve 37 so that the shuttle 70 is permitted to move upward within the liner 45. Warm fluid flows through the opening 51 and into the central chamber 78 and hydraulically acts against the valve disc 72 to push the shuttle 70 and the actuator assembly 58 connected thereto upward until the retainer 65 contacts the actuator sleeve 37. The piston 71 then starts to close the chilled fluid opening 52 in the liner 45 to substantially limit or even stop the flow of chilled fluid from the chilled fluid channel 29.

Referring again to FIG. 1, an important feature of the invention resides in the piston 71. The piston includes outer wall two flanges 75 and 76 defining an annular groove 85. The piston 71 also defines a number of piston channels 86 through the outer wall. The flanges 75 and 76, the liner 45 and the annular groove 85 define an annular cavity 77. The piston channels 86 are located to provide fluid communication between the annular cavity 77 defined by annular groove 85 and liner 45, and the central chamber 78 of piston 71. The flanges 75 and 76 are located to restrict the openings 52 and 53 in relation to the movement of the actuator 35 in the normal operating condition.

Fluid flows through the primary passageway in the normal operating condition. The primary passageway includes inlets 12 and 13, channels 28 and 29 and fluid openings 51 and 52. For the warm fluid, the primary passageway also includes the flow openings 74 in the valve disc 72 plus the central chamber 78. The chilled fluid opening 52 is in direct fluid communication with the mixing chamber 25.

Figure 2:
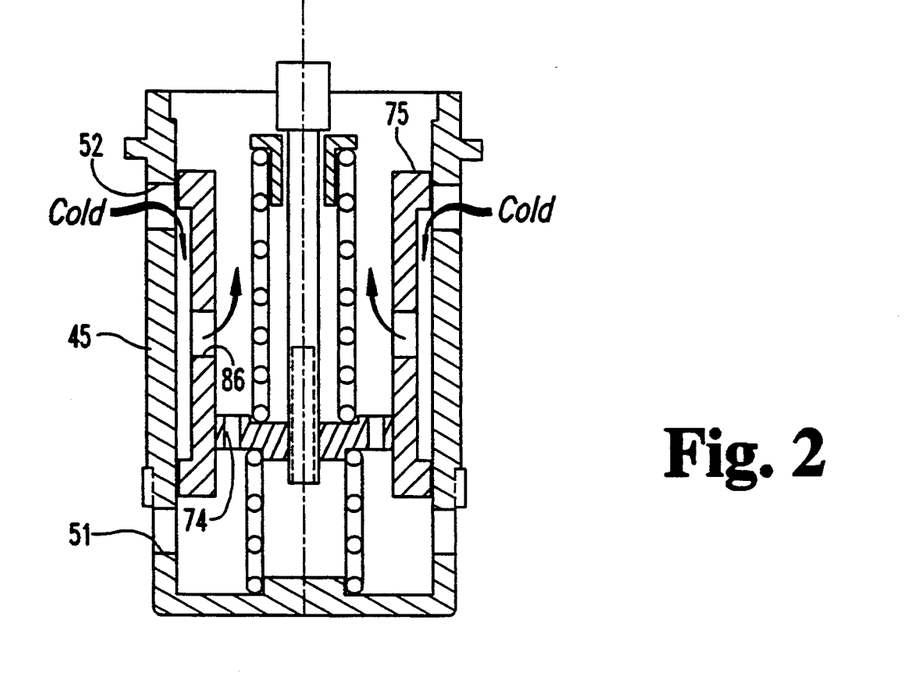
FIG. 2 is a side cross-sectional view of the present invention in the first failure position.

The annular cavity 77, the channels 28 and 29, and the central chamber 78 define a bypass or secondary passageway. The secondary passageway is open and operable when the shuttle is in a failure condition position. Referring to FIG. 2, when the shuttle 70 is in a first failure condition position, i.e., when the warm fluid supply ceases, the bellows thermostat 36 contracts and the biasing spring 80 pushes the shuttle 70 upwards. The upper flange 75 blocks the first passageway for the chilled fluid directly into the mixing chamber 25. The annular cavity 77 and the piston channel 86 provide a secondary passageway for the chilled fluid through the central chamber 77 and into the mixing chamber 25.

Figure 3:
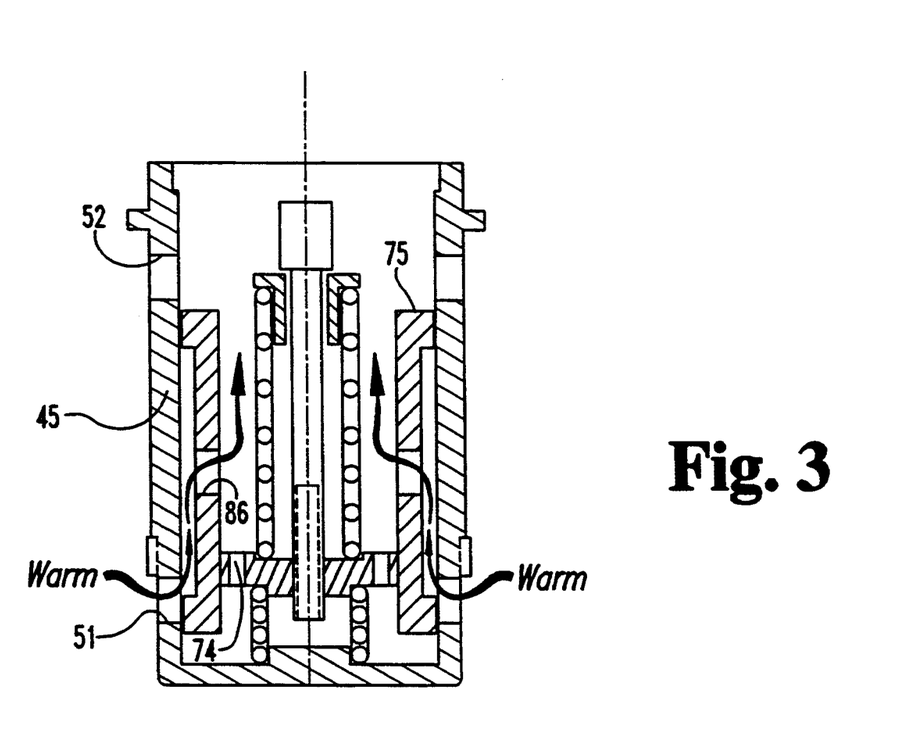
FIG. 3 is a side cross-sectional view of the present invention in the second failure position.

Referring to FIG. 3, when the chilled fluid supply ceases, the bellows thermostat 36 expands and acts upon the actuator 35 to push the shuttle 70 downward. The lower flange 76 blocks the passage of the warm fluid through the primary passageway. The annular cavity 77 and the piston channel 86 provide the second passageway for flow of the warm fluid into the central 77 and mixing 25 chambers. When normal flow resumes the valve assumes the normal operating condition, allowing fluid flow through the primary passageway.

The liner and piston dimensions can be calibrated to permit restricted flow under all fluid conditions. For example, the flanges and the internal diameter of the liner may be sized to provide a small clearance.

Alternatively, the shuttle 70 may include an open-ended, cylindrical piston 90 (FIG. 4, 5) with a longitudinal slot 91 along the entire length of the outer wall of the piston 90. The piston 90 defines the central chamber 78, which is in fluid communication with the mixing chamber 25. An upper end 92 of the shuttle 70 is open and a lower end 93 is closed by a valve disc 94. The valve disc 94 includes a threaded opening 73 into which the threaded end 63 of the guidepost 60 is engaged. The valve disc 94 defines a number of flow openings 74 at the lower end of the shuttle 70 for the passage of warm fluid.

Figure 4:
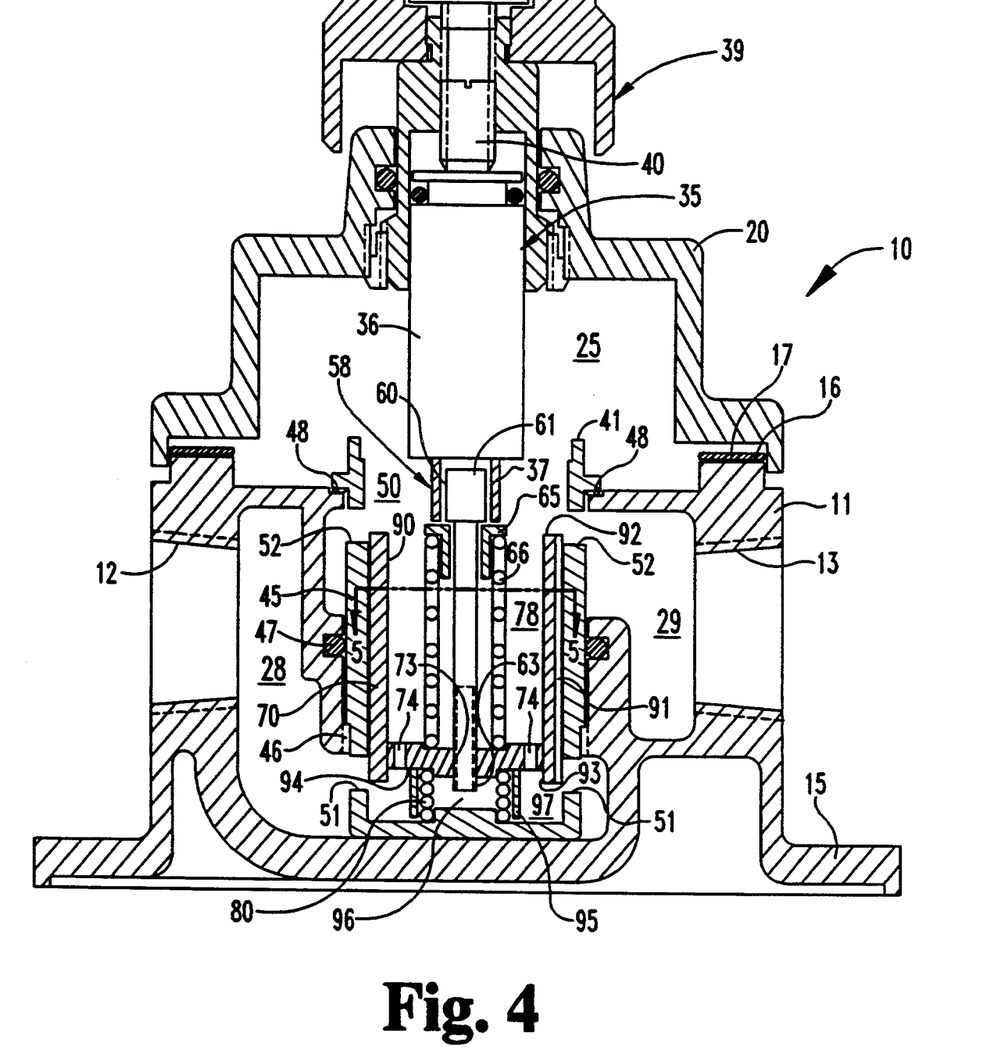
FIG. 4 is a side cross-sectional view of an alternate embodiment of the present invention in the second failure position.
Figure 5:
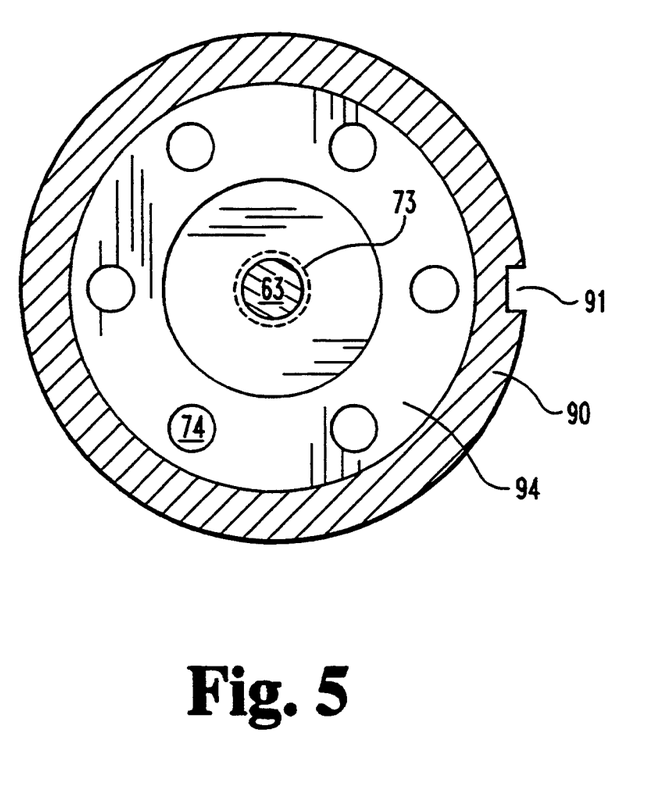
FIG. 5 is a top view of a section of a portion of the thermally controlled mixing valve assembly shown in FIG. 4, taken along line 5—5 as viewed in the direction of the arrows.

A hollow, open-ended projection 95 is centrally attached to the bottom of the valve disc 94. The projection 95 surrounds the threaded opening 73 and defines a void 96. The void 96 houses the biasing spring 80. The outer wall of the projection 95, the valve disc 94 and the interior wall of the liner 45 define a lower cavity 97.

In the normal operating condition, warm fluid flows through the primary passageway from the warm fluid channel 28 through the openings 74 and into the central chamber 78 on its way to be mixed with the chilled fluid in the mixing chamber 25. If the chilled fluid flow ceases, the bellows thermostat 36 expands and acts upon the actuator 35 to push the shuttle 70 downward to the second failure position. The projection 95 prevents the valve disc 94 from making contact with the liner 45. Fluid flows from the warm fluid opening 51 and through the secondary passageway, which includes the slot 91, the lower cavity 97 and the flow openings 74.

The slot 91 continuously allows a small amount of fluid flow through both openings 51 and 52 in the liner 45. The fluid flow through the slot 91 is uncontrolled but does not significantly affect the outflow temperature because the uncontrolled flow through slot 91 is insignificant compared to the total flow through the valve assembly.

In the preferred embodiment all the working components can be composed of stainless steel or bronze. Thus for instance, the liner 45, guidepost 60, shuttle 70, and valve disc 72 are all preferably composed of stainless steel. The valve body 11 and upper housing 20 can be cast from bronze or other suitable corrosion resistant material. The condition responsive actuator 35 in the preferred embodiment is a bellows thermostat 36. Coiled tubing may be brazed or soldered to the outside of the bellows thermostat 36 to provide additional heat transfer surface area for the fluid flowing through the bellows. Alternatively, the condition responsive actuator 35 may include some other type of thermostatic device.

While the invention has been illustrated and described in detail in the drawings and foregoing description, the same is to be considered as illustrated and not restrictive in character. The preferred embodiment of the flow control valve assembly described herein is only one example of this invention. Other valve constructions are possible. The location of inlets, openings, channels and other structures can vary according to the application. The preferred embodiment relates to temperature control. However, other embodiments can relate to other fluid conditions, such as pH or concentration. It is understood that only the preferred embodiment has been shown and described and that all changes and modifications that come within the spirit of the invention are desired to be protected.

What is claimed is:

1. A temperature control valve assembly for a carbonated beverage dispenser, comprising:
   a valve body defining:
      a warm fluid inlet;
      a chilled fluid inlet:;
      a fluid mixing chamber; and
      a fluid outlet communicating with said fluid mixing chamber;
   a cylindrical liner disposed within said valve body, said liner defining a warm fluid opening in communication with said warm fluid inlet and a chilled fluid opening in communication with said chilled fluid inlet;
   a flow control member for controlling flow of a warm fluid from the warm fluid opening and a relatively chilled fluid from the chilled fluid opening to said fluid mixing chamber, said flow control member defining a number of primary flow passageways between the fluid openings and said mixing chamber and a number of secondary flow passageways between the openings and said mixing chamber;
   said flow control member disposed within said valve body and moveable between positions in a normal operating condition in which substantially all flow from the fluid openings is directed through said primary flow passageways, and moveable to a failure condition in which substantially all flow from the openings is directed through said secondary passageways; and
   a condition responsive actuator disposed at least partially within said fluid mixing chamber and movable in response to a temperature of fluid in said mixing chamber, said actuator connected to said flow control member to move said member in the normal operating condition when fluid flows through both the first fluid opening and the second fluid opening, and to move said member to the failure condition when flow through one of either of the warm fluid opening or the chilled fluid opening ceases.

2. The temperature control valve assembly of claim 1, wherein said flow control member includes a shuttle disposed within said valve body, said shuttle defining said primary passageways and said secondary passageways, said shuttle restricting the flow of the warm fluid from the warm fluid opening and the flow of the chilled fluid from the chilled fluid opening in relation to movement of said condition responsive actuator in the normal operating condition.

3. The temperature control valve assembly of claim 2 wherein the shuttle further includes:
   an open-ended, hollow cylindrical piston, having an internal wall and an external wall, the piston restricting flow from the warm fluid opening and the chilled fluid opening in response to the actuator in the normal operating condition and;
   a valve disc circumferentially attached to the internal wall of the piston at an attachment point, said valve disc having a number of openings therethrough;
   said valve disc and the internal wall of the piston forming a central chamber in communication with the mixing chamber, the central chamber and the valve disc openings defining at least a portion of the primary flow passageways.

4. The flow control valve assembly of claim 3 wherein the shuttle is moveable to failure condition positions including a first failure position when the flow of the warm fluid ceases and a second failure position when the flow of the chilled fluid ceases.

5. The temperature control valve assembly of claim 4, wherein the flow control member further includes a pair of radial flanges on the exterior wall of the piston, the flanges located and sized ho restrict flow from the warm fluid opening and the chilled fluid opening in relation to movement of said actuator in the normal operating condition;
   the flanges, the exterior wall of the piston and the interior wall of the valve body defining an annular cavity between the flanges; and
   wherein the piston further defines a number of channels therethrough, the channels located to provide fluid communication between the annular cavity and the central chamber; the annular cavity, the channels, and the central chamber defining at least one of the secondary passageways.

6. The flow control valve assembly of claim 5, wherein the flanges are sized to provide clearance between the fluid openings and the flanges.

7. The temperature control valve assembly of claim 6, wherein said chilled fluid opening is in direct communication with said mixing chamber in the normal operating condition.

8. The temperature control valve assembly of claim 4 wherein the piston defines a longitudinal slot on the external wall of the piston, the slot located and sized to alternately provide fluid communication between the first fluid opening and said fluid mixing chamber when said shuttle is in the first failure position and between the second fluid opening and said valve disc openings when said shuttle is in the second failure position, the slot defining at least a portion of said secondary passageway.

9. A flow control valve assembly, comprising:
   a valve body defining:
      a first fluid inlet;
      a second fluid inlet;
      a fluid mixing chamber; and
      a fluid outlet communicating with said fluid mixing chamber;
   a flow control member for controlling flow of a first fluid from the first fluid inlet and a second fluid from the second fluid inlet to said fluid mixing chamber, said flow control member defining a number of primary flow passageways between said inlets and said mixing chamber and a number of secondary flow passageways between said inlets and said mixing chamber;
   said flow control member disposed within said valve body and moveable between positions in a normal operating condition in which substantially all flow from said inlets is directed through said primary flow passageways, and moveable to a failure condition in which substantially all flow from said inlets is directed through said secondary passageways; and a condition responsive actuator disposed at least partially within said fluid mixing chamber and movable in response to a condition of fluid in said mixing chamber, said actuator connected to said flow control member to move said member in the normal operating condition when fluid flows through both the first fluid inlet and the second fluid inlet, and to move said member to the failure condition when flow through one of either of the first fluid inlet or the second fluid inlet ceases.

10. The flow control valve assembly of claim 9, wherein said flow control member includes a shuttle disposed within said valve body, said shuttle defining said primary passageways and said secondary passageways, said shuttle restricting the flow of the first fluid from said first fluid inlet and the flow of the second fluid from said second fluid inlet in relation to movement of said condition responsive actuator in the normal operating condition, said shuttle moveable to failure condition positions including a first failure position when the flow of the first fluid ceases and a second failure position when the flow of the second fluid ceases.

11. The flow control valve assembly of claim 10 wherein the shuttle further includes:
   an open-ended, hollow cylindrical piston, having an internal wall and an external wall, the piston restricting flow from said first fluid inlet and said second fluid inlet in response to the actuator in the normal operating condition and;
   a valve disc circumferentially attached to the internal wall of the piston at an attachment point, said valve disc having a number of openings therethrough;
   said valve disc and the internal wall of the piston forming a central chamber in communication with the mixing chamber, the central chamber and the valve disc openings defining at least a portion of said primary flow passageways.

12. The flow control valve assembly of claim 11, wherein the flow control member further includes a pair of radial flanges on the exterior wall of the piston, the flanges located and sized to restrict said first inlet and said second inlet in relation to movement of said actuator in the normal operating condition;
   the flanges, the exterior wall of the piston and the interior wall of the valve body defining an annular cavity between the flanges; and
   wherein the piston further defines a number of channels therethrough, the channels located to provide fluid communication between the annular cavity and the central chamber; the annular cavity, the channels, and the central chamber defining at least one of said secondary passageways.

13. A flow control valve assembly, comprising:
   a valve body defining:
      a first fluid inlet;
      a second fluid inlet;
      a fluid mixing chamber; and
      a fluid outlet communicating with said fluid mixing chamber;
   a cylindrical liner disposed within said valve body, said liner defining a first fluid opening in communication with the first fluid inlet and a second fluid opening in communication with the second fluid inlet;
   a flow control member for controlling flow of a first fluid from the first fluid opening and a second fluid from the second fluid opening to said fluid mixing chamber, said flow control member defining a number of primary flow passageways between said openings and said mixing chamber and a number of secondary flow passageways between said openings and said mixing chamber;
   said flow control member disposed within said valve body and moveable between positions in a normal operating condition in which substantially all flow from said inlets is directed through said primary flow passageways, and moveable to a failure condition in which substantially all flow from said inlets is directed through said secondary passageways; and
   a condition responsive actuator disposed at least partially within said fluid mixing chamber and movable in response to a condition of fluid in said mixing chamber, said actuator connected to said flow control member to move said member in the normal operating condition when fluid flows through both the first fluid opening and the second fluid opening, and to move said member to the failure condition when flow through one of either of the first fluid opening or the second fluid opening ceases.

14. The flow control valve assembly of claim 13, wherein said flow control member includes a shuttle disposed within said valve body, said shuttle defining said primary passageways and said secondary passageways, said shuttle restricting the flow of the first fluid from the first fluid opening and the flow of the second fluid from the second fluid opening in relation to movement of said condition responsive actuator in the normal operating condition.

15. The flow control valve assembly of claim 14 wherein the shuttle further includes:
   an open-ended, hollow cylindrical piston, having an internal wall and an external wall, the piston restricting flow from the first fluid opening and the second fluid opening in response to the actuator in the normal operating condition and;
   a valve disc circumferentially attached to the internal wall of the piston at an attachment point, said valve disc having a number of openings therethrough;
   said valve disc and the internal wall of said piston forming a central chamber in communication with the mixing chamber, the central chamber and said valve disc openings defining at least a portion of said primary flow passageways.

16. The flow control valve assembly of claim 15 wherein said shuttle is moveable to failure condition positions including a first failure position when the flow of the first fluid ceases and a second failure position when the flow of the second fluid ceases.

17. The flow control valve assembly of claim 16, wherein said flow control member further includes a pair of radial flanges on the exterior wall of the piston, the flanges located and sized to restrict flow from the first opening and the second opening in relation to movement of said actuator in the normal operating condition;
   the flanges, the exterior wall of said piston and the interior wall of the valve body defining an annular cavity between the flanges; and wherein the piston further defines a number of channels therethrough, the channels located to provide fluid communication between the annular cavity and the central chamber; the annular cavity, the channels, and the central chamber defining at least one of said secondary passageways.

18. The flow control valve assembly of claim 17, wherein the flanges are sized to provide clearance between the fluid openings and the flanges.

19. The flow control valve assembly of claim 18, wherein the first fluid opening is in direct communication with the mixing chamber in the normal operating condition.

20. The flow control valve assembly of claim 16 wherein the piston defines a longitudinal slot on the external wall of the piston, the slot located and sized to alternately provide fluid communication between the first fluid opening and said fluid mixing chamber when said shuttle is in the first failure position and between the second fluid opening and said valve disc openings when said shuttle is in the second failure position, the slot defining at least a portion of said secondary passageway.

* * * * *